(12) United States Patent
Parthasarathy et al.

(10) Patent No.: US 10,193,838 B2
(45) Date of Patent: Jan. 29, 2019

(54) CONDITIONAL INSTANT DELIVERY OF EMAIL MESSAGES

(71) Applicant: Microsoft Technology Licensing, LLC, Redmond, WA (US)

(72) Inventors: Krishna Kumar Parthasarathy, Redmond, WA (US); Wayne Merl Cranston, Sammamish, WA (US); William James Whalen, Kirkland, WA (US); Neelamadhaba Mahapatro, Redmond, WA (US); Piyush Gupta, Bothell, WA (US); Faina Sigalov, Redmond, WA (US); Salil Kapoor, Remond, WA (US); Jonathan Sturgeon, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 148 days.

(21) Appl. No.: 14/978,116

(22) Filed: Dec. 22, 2015

(65) Prior Publication Data

US 2016/0261542 A1    Sep. 8, 2016

Related U.S. Application Data

(60) Provisional application No. 62/129,413, filed on Mar. 6, 2015.

(51) Int. Cl.
*H04L 12/58* (2006.01)

(52) U.S. Cl.
CPC ............ *H04L 51/12* (2013.01); *H04L 51/046* (2013.01); *H04L 51/14* (2013.01); *H04L 51/22* (2013.01);

(Continued)

(58) Field of Classification Search
CPC ....... H04L 51/12; H04L 51/14; H04L 51/046; H04L 51/36; H04L 51/26; H04L 51/22; H04L 51/30; H04L 51/04
See application file for complete search history.

(56) References Cited

U.S. PATENT DOCUMENTS 6,101,545 A    8/2000  Balcerowski et al.
6,185,603 B1   2/2001  Henderson et al.
(Continued)

FOREIGN PATENT DOCUMENTS

CN    1396531 A    2/2003
CN    1941749 A    4/2007
(Continued)

OTHER PUBLICATIONS

Martin, "What are the two blue ticks in VVhatsApp?—News—PC Advisor", PC Advisor, Nov. 10, 2014, retrieved from the interne on May 13, 2016 at URL:http://www.pcadvisor.co.uk/news/mobile-phone/what-are-two-blue-ticks-in-whatsapp-3584624/.

(Continued)

*Primary Examiner* — Michael A Keller
(74) *Attorney, Agent, or Firm* — Scott Y. Shigeta; Newport IP, LLC

(57) ABSTRACT

Technologies are described herein for providing delivery optimization of email messages. In particular, direct delivery system is provided for sending emails to allow for instant communication and collaboration. According to one aspect presented herein, a method is provided for instant or near instant delivery of a message. The method includes receiving the message from a client. Additionally, the method analyzes the message to determine if it meets one or more factors for taking a direct path.

16 Claims, 8 Drawing Sheets

(52) U.S. Cl.
CPC .............. *H04L 51/26* (2013.01); *H04L 51/30* (2013.01); *H04L 51/36* (2013.01); *H04L 51/04* (2013.01)

(56) References Cited

U.S. PATENT DOCUMENTS

| | | | |
|---|---|---|---|
| 6,430,604 | B1 | 8/2002 | Ogle et al. |
| 6,618,747 | B1 | 9/2003 | Flynn et al. |
| 6,782,414 | B1 | 8/2004 | Xue et al. |
| 6,978,293 | B1 | 12/2005 | Wong et al. |
| 6,993,660 | B1 | 1/2006 | Libenzi et al. |
| 7,222,156 | B2 | 5/2007 | Gupta et al. |
| 7,240,199 | B2 | 7/2007 | Tomkow |
| 7,394,761 | B2 | 7/2008 | Foster et al. |
| 7,406,501 | B2 | 7/2008 | Szeto et al. |
| 7,539,728 | B2 | 5/2009 | Perepa et al. |
| 7,680,895 | B2 | 3/2010 | Perlow et al. |
| 7,725,543 | B2 | 5/2010 | Shibata et al. |
| 7,756,929 | B1 | 7/2010 | Pettigrew |
| 7,756,936 | B2 | 7/2010 | Rosenberg et al. |
| 7,774,413 | B2 | 8/2010 | Costea et al. |
| 7,836,132 | B2 | 11/2010 | Qureshi et al. |
| 7,865,965 | B2 | 1/2011 | Kramer et al. |
| 8,219,626 | B2 | 7/2012 | Muller et al. |
| 8,301,711 | B2 | 10/2012 | Roberts |
| 8,306,056 | B2 | 11/2012 | O'Brien et al. |
| 8,438,225 | B2 | 5/2013 | Serr et al. |
| 8,447,816 | B2 | 5/2013 | Tian |
| 8,688,789 | B2 | 4/2014 | Katis et al. |
| 8,706,819 | B2 | 4/2014 | Agarwal et al. |
| 8,706,825 | B2 | 4/2014 | Huang et al. |
| 8,761,737 | B2 | 6/2014 | Clarke et al. |
| 8,832,299 | B2 | 9/2014 | Katis et al. |
| 8,881,020 | B2 | 11/2014 | Affronti et al. |
| 9,002,937 | B2 | 4/2015 | Levien et al. |
| 9,014,540 | B1 | 4/2015 | Cholas et al. |
| 9,047,588 | B2 | 6/2015 | Jaquinta |
| 2002/0035605 | A1* | 3/2002 | McDowell ............... H04L 29/06 709/206 |
| 2002/0144154 | A1 | 10/2002 | Tomkow |
| 2004/0078447 | A1 | 4/2004 | Malik |
| 2004/0158611 | A1 | 8/2004 | Daniell et al. |
| 2005/0021650 | A1 | 1/2005 | Gusler et al. |
| 2005/0188201 | A1 | 8/2005 | Sala et al. |
| 2005/0223077 | A1 | 10/2005 | Vellanki et al. |
| 2006/0007466 | A1* | 1/2006 | Ben-Yehuda ......... G06F 17/227 358/1.13 |
| 2006/0031464 | A1 | 2/2006 | Bowman |
| 2006/0064462 | A1 | 3/2006 | Chen |
| 2006/0075003 | A1 | 4/2006 | Adams |
| 2006/0101489 | A1 | 5/2006 | Roden et al. |
| 2006/0253539 | A1 | 11/2006 | Casperson et al. |
| 2006/0265459 | A1 | 11/2006 | Petry et al. |
| 2007/0156817 | A1 | 7/2007 | Daffner et al. |
| 2007/0214219 | A1 | 9/2007 | Chen |
| 2007/0233789 | A1 | 10/2007 | Agarwal et al. |
| 2008/0052362 | A1 | 2/2008 | Bauchot |
| 2008/0098237 | A1 | 4/2008 | Dung et al. |
| 2008/0141346 | A1 | 6/2008 | Kay et al. |
| 2008/0313402 | A1 | 12/2008 | Wong et al. |
| 2009/0144380 | A1 | 6/2009 | Kallman et al. |
| 2009/0150397 | A1* | 6/2009 | Chen ................. G06F 17/30722 |
| 2009/0150506 | A1* | 6/2009 | Wang ....................... H04L 51/24 709/206 |
| 2009/0172399 | A1 | 7/2009 | Schmid |
| 2009/0248806 | A1 | 10/2009 | Teman |
| 2010/0011079 | A1 | 1/2010 | Hitchcock |
| 2010/0077037 | A1 | 3/2010 | Turakhia |
| 2010/0131599 | A1 | 5/2010 | Giovannelli |
| 2010/0250681 | A1 | 9/2010 | Van Wely |
| 2010/0332601 | A1 | 12/2010 | Walter et al. |
| 2011/0293251 | A1 | 1/2011 | Roberts et al. |
| 2011/0264630 | A1 | 10/2011 | Edelen |
| 2011/0289158 | A1 | 11/2011 | Terranova |
| 2013/0238728 | A1* | 9/2013 | Fleck ...................... H04L 51/36 709/206 |
| 2013/0305164 | A1 | 11/2013 | Karunamuni et al. |
| 2014/0025757 | A1 | 1/2014 | Haugen et al. |
| 2014/0074893 | A1 | 3/2014 | Griffin |
| 2014/0149715 | A1* | 5/2014 | Inman ............... G06F 15/17393 712/29 |
| 2014/0344369 | A1 | 11/2014 | Goldberg et al. |
| 2015/0350132 | A1 | 12/2015 | Karnin |
| 2016/0182451 | A1* | 6/2016 | Nandagopal ........ H04L 63/0245 726/12 |
| 2016/0261534 | A1 | 9/2016 | Parthasarathy et al. |
| 2016/0261535 | A1 | 9/2016 | Parthasarathy et al. |
| 2016/0261551 | A1 | 9/2016 | Parthasarathy et al. |

FOREIGN PATENT DOCUMENTS

| | | |
|---|---|---|
| EP | 1372316 A1 | 12/2003 |
| EP | 1737171 A1 | 12/2006 |
| EP | 2144408 A1 | 1/2010 |
| GB | 2498399 A | 7/2013 |
| WO | 2001010090 A1 | 2/2001 |
| WO | 2007071040 A1 | 6/2007 |
| WO | 2013189725 A1 | 12/2013 |
| WO | WO2013189725 | 12/2013 |

OTHER PUBLICATIONS

PCT Search Report and Written Opinion dated May 25, 2016 for PCT Application No. PCT/US16/20147, 10 pages.
The PCT Search Report and Written Opinion dated May 27, 2016 for PCT application No. PCT/US2016/02148, 10 pages.
The PCT Search Report and Written Opinion dated Jun. 14, 2016 for PCT application No. PCT/US2016/020794, 10 pages.
The PCT Search Report and Written Opinion dated Jun. 7, 2016 for PCT application No. PCT/US2016/020149, 11 pages.
PCT/US2016/020794—International Preliminary Report on Patentability, dated Feb. 22, 2017, 7 pages.
PCT/US2016/020147—International Preliminary Report on Patentability, dated Feb. 14, 2017, 6 pages.
PCT/US2016/020149—International Preliminary Report on Patentability, dated Feb. 16, 2017, 6 pages.
International Search Report & Written Opinion Issued in PCT Application No. PCT/US2016/020149, dated Jun. 7, 2016, 11 Pages.
PCT/US2016/020148, International Preliminary Examining Authority, dated Feb. 10, 2017, 6 pages.
International Search Report and Written Opinion for PCT/US2016/018558 dated Jun. 8, 2016, 13 pages.
"International Preliminary Report on Patentability Issued in PCT Application No. PCT/US2016/020148", dated Jun. 6, 2017, 7 Pages.
U.S. Appl. No. 14/978,414—Non Final Office Action, dated Jul. 31, 2017, 19 pages.
"Office 365", Retrieved on: Jan. 28, 2015, Available at: http://www.vorsite.com/Office-365.php, 2 pages.
U.S. Appl. No. 14/978,238—Non Final Office Action, dated Sep. 15, 2017, 16 pages.
U.S. Appl. No. 14/978,572—Non Final Office Action, dated Dec. 26, 2017, 9 pages.
U.S. Appl. No. 14/978,238—Final Office Action, dated Jan. 19, 2018, 18 pages.
U.S. Appl. No. 14/978,414—Final Office Action, dated Jan. 26, 2018, 20 pages.
"Content Conversion", Retrieved from https://technet.microsoft.com/en-us/library/bb232174(v=exchg.160).aspx, Jun. 16, 2013, 5 Pages.
"Get Delivery and Read Receipt Confirmations", Retrieved from https://support.office.com/en-us/article/Get-delivery-and-receipt-confirmations-a34bf70a-4c2c-4461-b2a1-12e4a7a92141, Retrieved on: Oct. 26, 2015, 3 Pages.
"Read Receipts", Retrieved from: https://web.archive.org/web/20151012214846/https://support.google.com/a/answer/1385059?hl=en, Oct. 27, 2015, 3 Pages.

(56) References Cited

OTHER PUBLICATIONS

"Non Final Office Action Issued in U.S. Appl. No. 14/978,239", dated May 18, 2018, 18 Pages.
Singh, et al., "Comprehensive Multi-platform Collaboration", in Columbia University Computer Science Technical Reports, CUCS-027-03, Dec. 2003, 12 Pages.
"Office Action Issued in European Patent Application No. 16711718.3", dated Jun. 21, 2018, 5 Pages.
"Office Action Issued in European Patent Application No. 16711728.2", dated Jun. 21, 2018, 5 Pages.
"Non-Final Office Action Issued in U.S. Appl. No. 14/978,414", dated Sep. 10, 2018, 24 Pages.
"Final Office Action Issued in U.S. Appl. No. 14/978,239", dated Oct. 9, 2018, 23 Pages.

* cited by examiner

DELIVERY OPTIMIZATION OF MESSAGING – INSTANT ACKNOWLEDGMENT

CONDITIONAL INSTANT DELIVERY OF EMAIL MESSAGES

CROSS-REFERENCE TO RELATED APPLICATION(S)

This application claims the benefit of U.S. Provisional Patent Application Ser. No. 62/129,413 filed on Mar. 6, 2015, entitled "DELIVERY OPTIMIZATION OF EMAIL MESSAGES," the entirety of which is expressly incorporated herein by reference.

BACKGROUND

Currently there are a number of different formats for electronic communication for messaging including instant messaging, electronic mail (email) and text messaging, among other formats. Many of these formats have specific advantages and drawbacks to using them. For example, messages sent via email are known to have inherent latency issues. Other communication formats, such as instant messaging provide real time communication but do not provide other mechanisms for allowing more rich collaboration features.

It is with respect to these considerations and others that the disclosure made herein is presented.

SUMMARY

Technologies are described herein for providing delivery optimization of email messages. In general, the optimization involves a direct delivery system for emails that meet one or more conditions. According to aspects presented herein, a method is provided for delivering a message. The method includes receiving the message from a client. Additionally, the method analyzes one or more conditions to determine if the message qualifies for a direct delivery system. If the message does not qualify for a direct delivery system, a set of operations are applied to the message to deliver the message to a recipient. If the message qualifies for a direct delivery system, a subset of the operations are applied to the message to deliver the message to the recipient. In some configurations, when using the subset of the operations, if the direct delivery system of the message fails, the full set of operations are used to deliver the message to the recipient.

When the subset of the operations are used for the delivery of the message, other operations that are not part of the subset of operations may be applied to the message subsequent to the delivery of the message. The message may be delivered to different recipients using different sets of operations depending on one or more conditions. Techniques providing an acknowledgement of a message delivery may be provided by modifying properties of a mailbox associated with the sender of the message.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
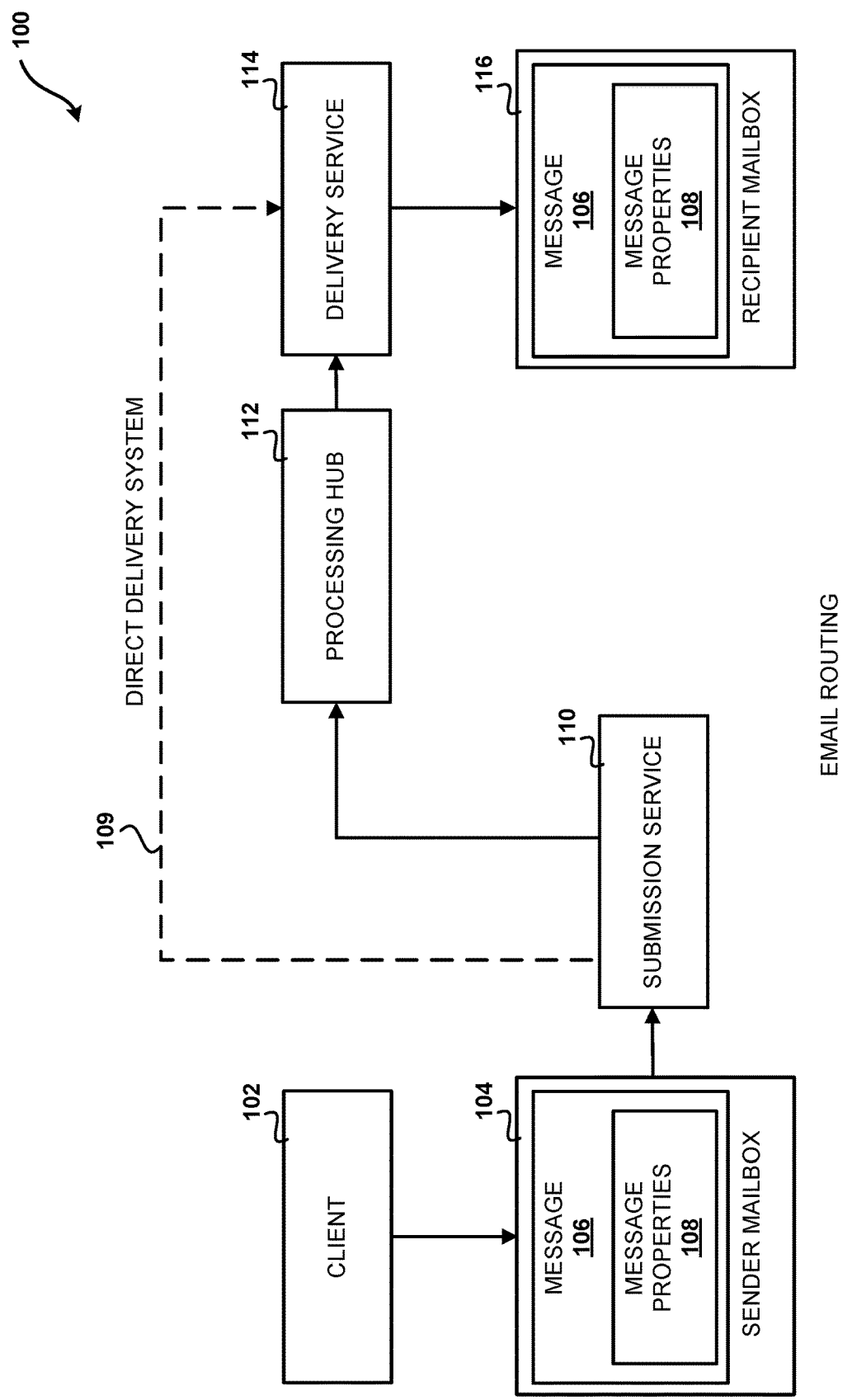
FIG. 1 is a system diagram showing aspects of an illustrative system disclosed herein for providing delivery optimization of email messages.

The following detailed description is directed to technologies for providing delivery optimization of email messages. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of a computing system and methodology for providing delivery optimization of email messages will be described.

Email based communications generally involve latency issues, which prevent emails systems from being used for real-time communication applications. The techniques described herein provide the ability for instant communication via email. By use of the techniques disclosed herein, email systems and email accounts may be used for instant communication without having to use specialized applications or accounts configured for specialized applications. As will be described in more detail, the use of a user's existing email account and email application for instant communication allows for increased collaboration between users.

As discussed further below, providing delivery optimization of email messages increases user efficiency by leveraging familiarity with existing applications, such as an email application. User efficiency is also increased by utilizing an existing email account for instant communication, rather than having separate accounts for both email and instant messaging.

Email messages may suffer delays of delivery, which may be a broad range from several seconds to much longer periods of time. Some delays are known to be around ninety seconds. Occasionally, these delays may be even longer. Providing delivery optimization of email messages may provide delivery of messages in less than two seconds. For illustrative purposes, the terms "instant delivery" and "direct delivery" refer to mechanisms associated with reduced latency. By use of the techniques disclosed herein, users do not need an additional application or account to utilize delivery optimization of email messages. The user may utilize an existing email account and email application. Additional details regarding these mechanisms, and others, will be provided below with regard to FIGS. 1-8.

Turning now to FIG. 1, details will be provided regarding an illustrative operating environment and several software components disclosed herein. In particular, FIG. 1 is a system diagram showing aspects of an illustrative system for providing delivery optimization of email messages. The system 100 shown in FIG. 1 includes a client 102 capable of composing, displaying, sending and/or receiving email messages. The client 102 may be one or more computing devices such as the example computing device architecture shown in FIG. 8 and described in more detail below. In this regard, it should be appreciated that the client 102 may refer to any number of computing devices, working alone or in concert, capable of sending and/or receiving email. For example, and without limitation, the technologies utilized herein might include a standalone email application or other applications, such as a web browser and/or services such as those shown in FIG. 7.

FIG. 1 shows the client 102 sending a message 106. The message 106 may be sent to a sender mailbox 104 using one or more known techniques for delivering messages to a mailbox. In some configurations (not shown in FIG. 1), the client 102 transfers the message 106 to the sender mailbox 104. The submission service 110 is then notified of the existence of the new message 106 in the sender mailbox 104. Other configurations for submitting the message 106 are possible. Next, based on one or more factors, the message 106 may be delivered to a recipient mailbox 116 using a direct delivery system 109 or by the use of a processing hub 112.

As will be described in more detail below, depending on one or more aspects of the message 106 and/or other factors, the processing hub 112 may perform operations. For example, and without limitation, the operations may include malware scanning, resolving, compliance checking, queuing, archiving, and/or SPAM filtering, before the message 106 is delivered to the recipient mailbox 116. The processing hub 112 may perform many other complex functions such as creating copies of messages 106 for high availability purposes. Other operations are possible without departing from the scope and spirit of the present description, with the foregoing examples provided only to facilitate this discussion. Depending on the aspects of the message 106 and/or other factors, the system 100 may deliver the message 106 using the direct delivery system 109, which may only perform a subset of operations, e.g., only the malware scanning and compliance checking, before the message 106 is delivered to the recipient mailbox 116. The message 106 may be delivered to some recipients utilizing the direct delivery system 109 and to other recipients from the processing hub 112. The decision to deliver the message 106 utilizing direct delivery system 109 may occur on a per recipient basis. By subjecting the message to a subset of operations using the direct delivery system 109, latency of the delivery to the recipient mailbox 116 may be mitigated. For instance, in some configurations, the delivery of a message 106 using the processing hub 112 may involve a queuing mechanism to manage processing. In some configurations, delivery of the message 106 using the direct delivery system 109 eliminates any queuing as a means to manage processing, and also eliminates some of the processing functions. This elimination benefits in two ways: first it removes the potential for in delays inherent in any queuing function and, second, there are fewer operations required to deliver the message. As described herein, the directed delivery techniques mitigate the need to queue a message, e.g., manage processing, thus tasks such as queuing may be eliminated.

In scenarios where the direct delivery system 109 is used, the message 106 may be written directly into the recipient mailbox 116 by use of a delivery service 114. In doing so, the system 100 may also directly modify the message properties 108 of the message 106 in the sender mailbox 104 indicating acknowledgement of the delivery. In addition, in scenarios where the direct delivery system 109 is used, the processing hub 112 may perform other operations on the message 106, e.g., archiving, search indexing, make a redundant copy for high availability purposes, after the message 106 has been delivered to the recipient mailbox 116.

Figure 2:
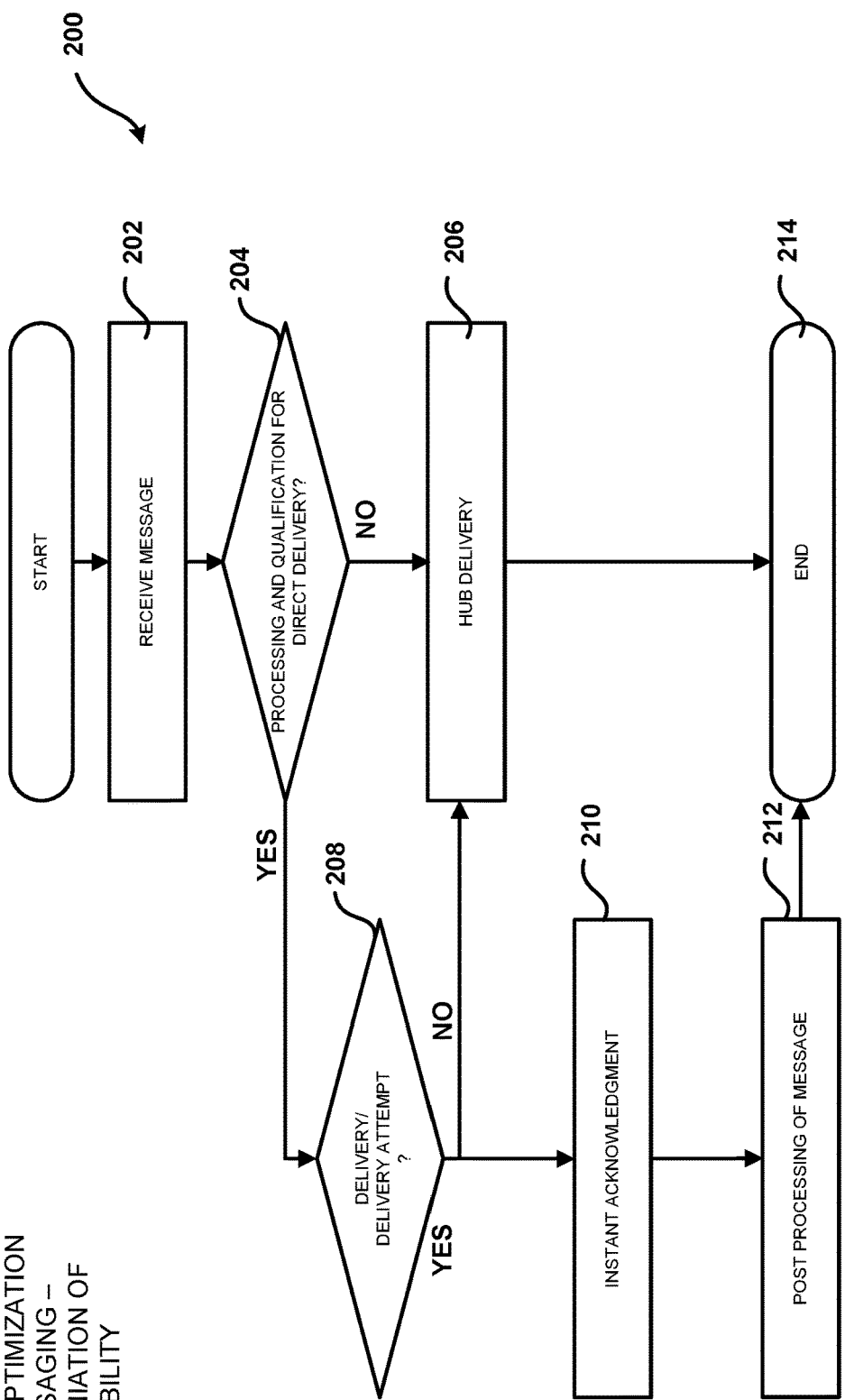
FIG. 2 is a flow diagram showing an illustrative routine that may be used with the system illustrated in FIG. 1.

In some configurations, the system 100 may deliver the message 106 using the direct delivery system 109 or the processing hub 112 depending on the size of the message 106, the number of recipients, a message type, a timestamp indicating an age of the message 106 and/or other factors. Based on one or more conditions considering such factors, the system 100 may also deliver the same message 106 to different recipients using different mechanisms, e.g., the direct delivery system 109 or the processing hub 112. FIG. 2, discussed below, describes the determination of eligibility of messages for the direct delivery system 109.

Figure 3:
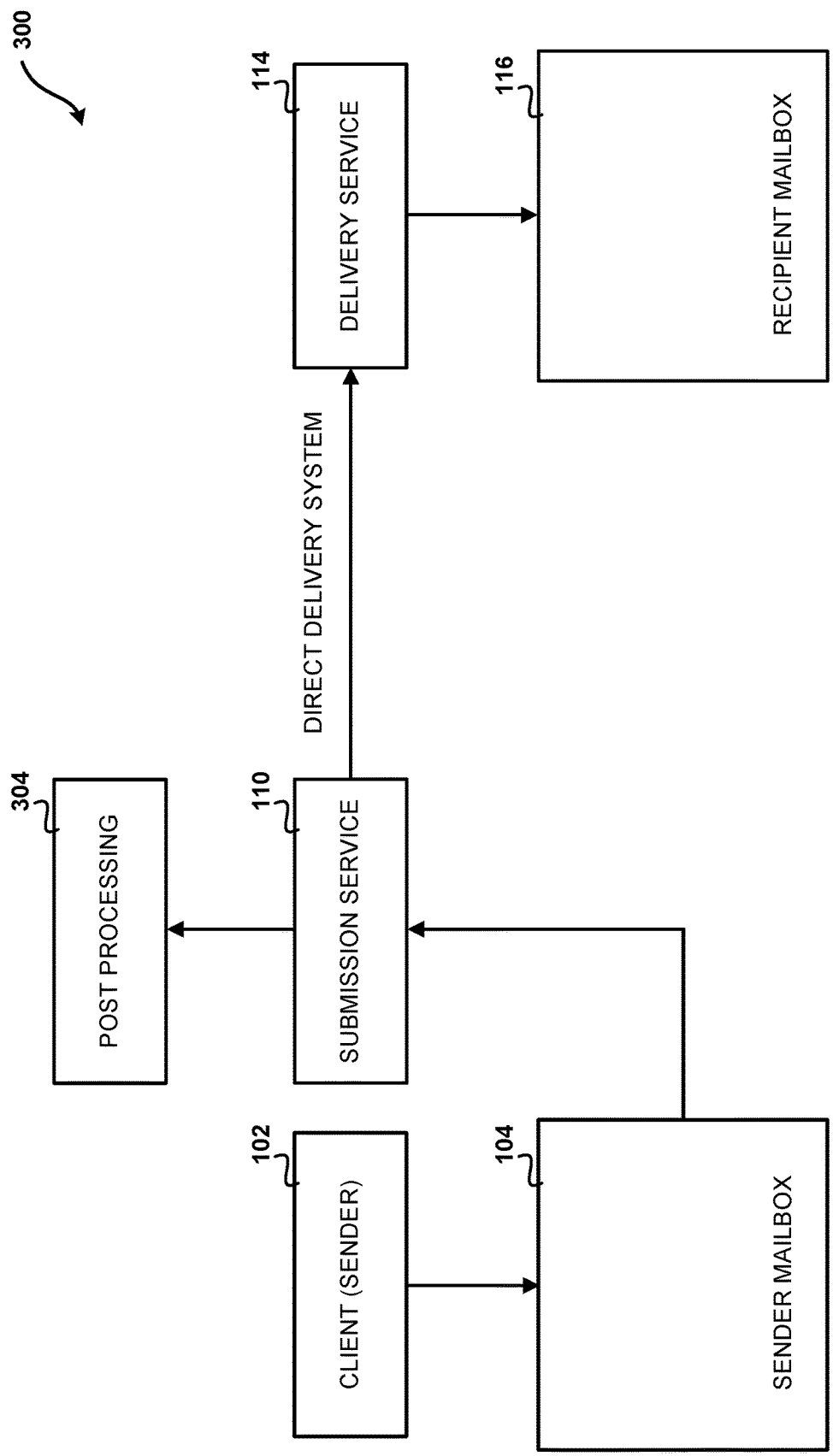
FIG. 3 is a system diagram showing aspects of an illustrative system disclosed herein for providing delivery optimization of email messages, including post processing of messaging.
Figure 4:
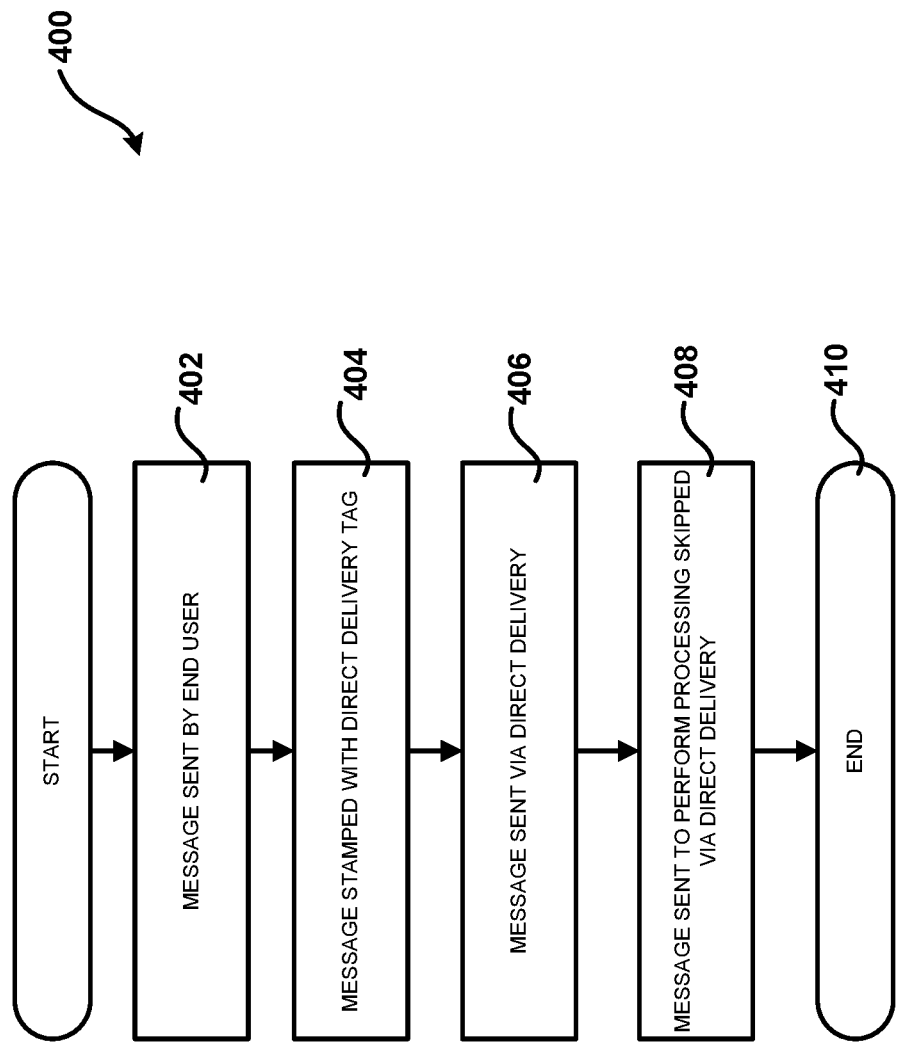
FIG. 4 is a flow diagram showing an illustrative routine that illustrates aspects of the operation of the system illustrated in FIG. 3 relating to post processing of messages.

The submission service 110 may also perform a subset of the processes normally performed in the processing hub 112. If the message 106 is sent to the mailbox of the recipient 116 before being sent to the processing hub 112, then message 106 may be sent additionally to the processing hub 112 for post processing. Although the message may be sent from submission twice, the message 106 may be stopped from being delivered twice to the delivery service 114 of the recipient's mailbox 116. FIGS. 3 and 4, discussed below, cover processing of the message 106 prior to delivery and post processing of the message 106 after it has already been sent once to the delivery service 114 of the recipient's mailbox 116.

Figure 5:
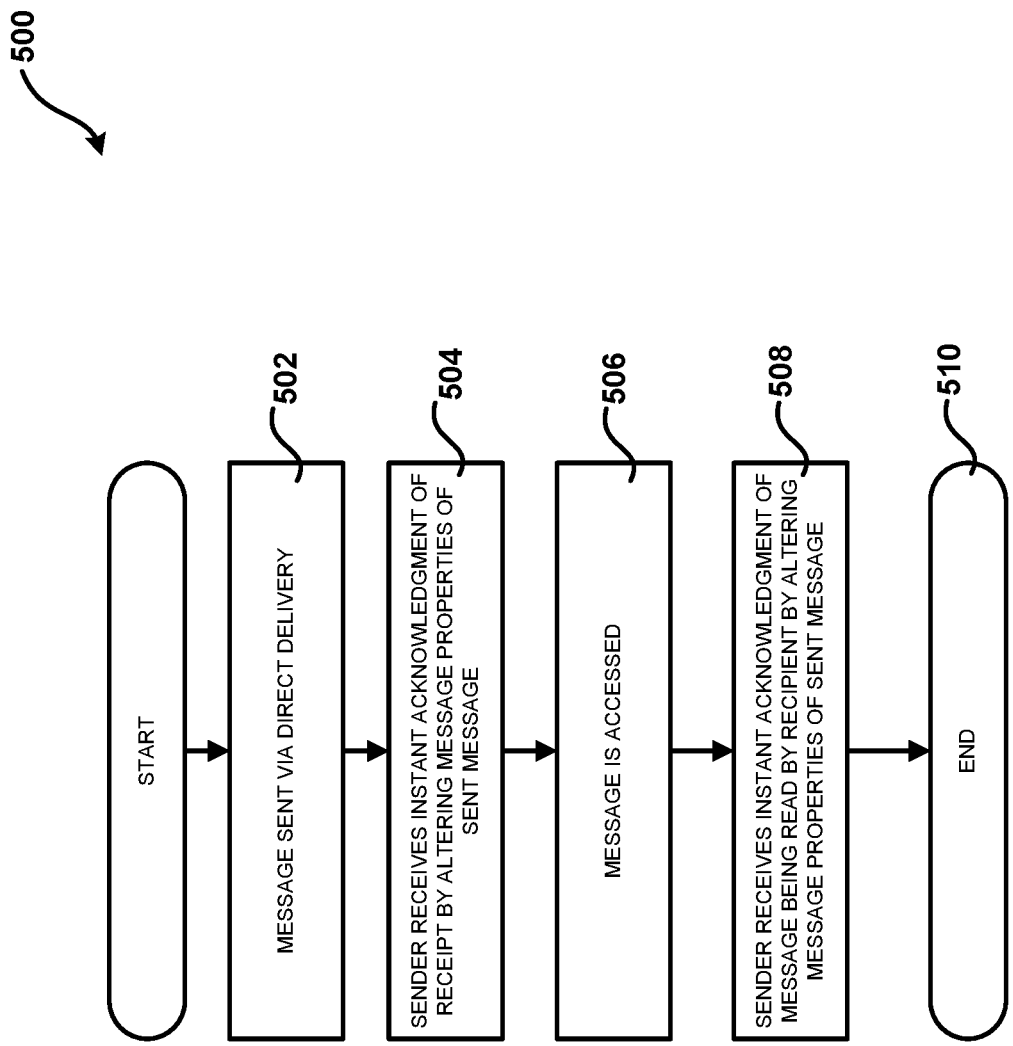
FIG. 5 is a flow diagram showing an illustrative routine that illustrates aspects of providing delivery optimization of email messages relating to instant acknowledgement.

As summarized above, the message properties 108 may also be utilized to track delivery, non-delivery and other characteristics of the message 106 on a per recipient basis. For example, some message properties 108 may indicate if a message is read or unread. As will be described herein, these properties are updated directly by the system 100 for instant acknowledgement of delivery and/or other functions or tasks. FIG. 5, discussed below, covers acknowledgement of messages utilizing message properties 108.

Referring now to FIG. 2, additional details regarding the technologies for providing delivery optimization of email messages are described. In particular, FIG. 2 is a flow diagram showing an illustrative routine 200 that illustrates aspects of the above-described processing of the system illustrated in FIG. 1.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the submission service 110 receives the message 106 from the client 102. The submission service 110 may receive the message 106 in response to the client 102 sending the message 106 to the sender mailbox 104.

From operation 202, the routine 200 proceeds to operation 204, where the submission service 110 may determine whether the message 106 qualifies to be delivered via direct delivery system 109. The submission service 110 may utilize factors to determine whether the message 106 qualifies for direct delivery system 109. These factors might include, but are not limited to, message size, message type, the number of recipients, recipients belonging to a same organization as the sender, the type of recipient and/or a timestamp of the message 106. Any number of these or other factors may be utilized to determine whether the message 106 qualifies to be sent on the direct delivery route to the mailbox of the recipient 116.

The message size of the message 106 may be utilized to determine eligibility of the message 106 for transmission using the direct delivery system 109. For example, a message size above a certain threshold may not be sent on this path and may instead be sent to the processing hub 112.

Additionally, the type of the message 106 may be utilized to determine eligibility of the message 106 for transmission using the direct delivery system 109. For example, meeting notifications may be sent to the processing hub 112 instead of using the direct delivery system 109.

The number of recipients of the message 106 may also be used to determine eligibility of the message 106 for transmission using the direct delivery system 109. As an example, if the number of recipients exceeds a threshold, the message 106 may be sent to the processing hub 112 for delivery of the message 106 to the recipients.

The submission service 110 may also determine eligibility of the message 106 for transmission on the direct delivery system 109 depending on one or more associations between the sender and the recipients. For example, if the sender is in the same organization as the recipients, e.g., same set of domains managed by a single organization/entity, the message 106 may be eligible for transmission using the direct delivery system 109. For recipients that are external to the sender, e.g., a different organization, the message 106 may be sent using the processing hub 112. Additionally, a message 106 may be sent to a subset of recipients using the direct delivery system 109 if the subset of recipients are in the same organization, and also deliver the same message 106 to other recipients outside the organization using the processing hub 112.

Also, the type of recipient may determine whether the message 106 is sent via direct delivery system 109 to the recipient 116 for these recipients. As an example, recipients that are on a distribution list may only receive messages 106 via the processing hub 112.

In another example, a single organization may have a number of users in a first system, e.g. a cloud system, and number of users in a second system, e.g., an on-premise system. In such a structure, a message 106 may only be eligible for using direct delivery system between users within one of the systems. For instance, a user of the cloud system may only use direct delivery system for other users on the cloud system. In this example, if a user of the cloud system sends a message 106 to a user of the on-premise system, the message may not be eligible for using direct delivery system, and other delivery mechanisms may be used.

As another example, a message 106 may be sent from a sender to multiple recipients, where the recipients and the sender are in a single organization. In this example, some of the recipients have mailboxes in the cloud, while other recipients have mailboxes on-premise. If the sender's mailbox 104 is also in the cloud, the message 106 will be delivered to the recipients with mailboxes in the cloud using the direct delivery system 109, while also delivering the same message 106 to the other recipients with mailboxes in the on-premise system using the processing hub 112.

Additionally, a timestamp of the message 106 may determine whether the message 106 is sent directly to the mailbox of the recipient 116 for these recipients. As an example, if a timestamp indicates that the message 106 is older than a certain threshold, then the message may be sent to the processing hub 112 prior to delivery, since the timestamp may indicate that the message 106 is no longer current enough for instant communication. For illustrative purposes, factors and/or conditions using the timestamp is referred to as a "freshness" factor.

Along with determining whether the message 106 qualifies for direct delivery system 109, the submission service 110 may perform a subset of the processing that normally occurs in the processing hub 112. The processing occurring in direct delivery system 109 might include, but is not limited to, malware scanning and compliance checking. These delivery tasks may also be used to determine eligibility of the message 106 for transmission using the direct delivery system 109. Thus, in addition to checking the conditions described above, e.g., the number of recipients, a subset of the delivery operations may be executed as part of operation 204. This may include tasks such as malware scanning, resolving, and compliance. As these tasks are executed the system may determine that the message 106 is not eligible for direct delivery system 109. For instance, this may occur if one or more of the eligibility criteria are not met. In some configurations, if these tasks are performed successfully, the routine 200 proceeds to operation 208 where a delivery attempt is made. In another example, certain conditions related to a message 106 may be used to determine if the message 106 is eligible for transmission using the direct delivery system 109. For instance, the system 100 may be configured to examine messages 106 during submission to determine if the messages require a particular task. If it is determined that a message 106 requires a particular task during submission, such as queuing, the system 100 may determine that the message 106 is not eligible for transmission using the direct delivery system 109. In such an example, a system may disqualify a message 106 for direct delivery system if the message 106 requires queuing since queuing may involve multiple operations to obtain information from external resources, which may add inherent latency. This example is provided for illustrative purposes and is not to be construed as limiting, as tasks other than queuing and/or other conditions associated with individual messages may be used to determine if a message is eligible for directly delivery 109.

From operation 204, the routine 200 may proceed to operation 206 if it is determined that the message 106 does not qualify for direct delivery system 109. At operation 206, the message 106 is subject to a set of number of email processing operations. As discussed above, the processing hub 112 may perform number of tasks on the message 106, which may involve a resolving process, malware scanning, compliance checking and other tasks. After the processing hub 112 completes its tasks, the message 106 may be delivered to the mailbox of the recipient 116. If one or more delivery tasks were performed as part of operation 204, operation 206 may skip those previously executed tasks. For instance, if operation 204 performed the malware scanning, operation 206 may skip that task. From operation 206, the routine 200 may continue to operation 214 where routine 200 ends.

From operation 204, the routine 200 may proceed to operation 208 if it is determined that the message 106 qualifies for direct delivery system 109. At operation 208, an attempt is made to deliver the message 106. In some configurations, operation 208 may involve a direct write of the message 106 into the recipient mailbox 116. The delivery attempt may be made using any known technique. In addition, the verification of the delivery may involve one or more known technologies. For example the delivery attempt may include one or more technologies such as those using Hypertext Transfer Protocol (HTTP). If the delivery of the message 106 is unsuccessful, then routine 200 continues to operation 206. Although this example utilizes HTTP, it can be appreciated that this example is provided for illustrative purposes and is not to be construed as limiting as many other transfer protocols may be used with the routine 200. At operation 206, the message 106 may go through hub processing 112, as discussed above. The message 106 may then be delivered via other techniques, such as those utilizing Simple Mail Transfer Protocol (SMTP). From operation 206, the routine 200 may continue to operation 214 where routine 200 ends.

From operation 208, the routine 200 proceeds to operation 210 when the delivery attempt is successful. At operation 210 the system 100 may generate an acknowledgement. In one example, the sender may receive an instant acknowledgment that the message 106 was successfully delivered to the recipient(s). This operation may involve a direct write into the properties 108 of the message 106 in the sender mailbox 104. Utilizing the message properties 108, message delivery can be tracked on a per recipient basis. Rather than receiving a delivery receipt, the message properties 108 may be altered to indicate delivery for a particular recipient. FIG. 5, discussed below, covers acknowledgment of messages utilizing message properties 108.

From operation 210, the routine 200 continues to operation 212 where the message 106 may undergo additional processing. As discussed above, a message 106 that is delivered using the direct delivery system, may only be subjected to a subset of tasks that would occur if the message 106 is delivered using the hub 112. This message would then be subject to post processing of operation 212 which may include archiving, or making a redundant copy for high availability purposes of one or more messages or other complex operations. From operation 212, the routine 200 proceeds to operation 214, where the routine 200 ends.

Referring now to FIG. 3, which is a system diagram showing aspects of an illustrative system disclosed herein for providing delivery optimization of email messages. The system 300 shown in FIG. 3 includes the client 102 and the sender mailbox 104. Additionally, the delivery service 114 and the recipient mailbox 116 are included in FIG. 3.

FIG. 3 illustrates the direct delivery system that messages may follow. As discussed above, the submission service 110 may perform a subset of operations that are performed by the processing hub 112. Once the message 106 is delivered via the direct delivery system, the message 106 may undergo processing that is normally managed by the processing hub 112.

The post processing 304 may process tasks that were initially skipped by the submission service 110. These tasks may involve one or more tasks including archiving, or making a redundant copy for high availability purposes, among other tasks. Once the post processing 304 is completed, the message 106 is not delivered again to the recipient mailbox 116. FIG. 4, discussed below, covers the processing and post processing of the message 106 in more detail.

Turning now to FIG. 4, additional details will be provided regarding the technologies presented herein for providing delivery optimization of email messages. In particular, FIG. 4 is a flow diagram showing an illustrative routine 400 that illustrates aspects of the post processing illustrated in FIG. 1 and FIG. 3.

The routine 400 begins at operation 402, where a message is sent by an end user. The end user may send the message using an application utilizing a computer, such as the client 102. From operation 402 the routine 400 continues to operation 404.

At operation 404, the message may be stamped with a direct delivery tag. The direct delivery tag may indicate that the client or another device has made a determination to use the direct delivery system to send the message. Alternatively, the message may be stamped with a direct delivery tag may indicate that the message has been certified to send via the direct delivery system. The certification process may include routine 200 discussed above regarding FIG. 2.

From operation 404 the routine 400 may continue at operation 406. At operation 406, the message may be sent via the direct delivery system. As summarized above, some tasks may be performed by the processing hub 112 may be skipped by sending the message via the direct delivery system. In some configurations, the direct delivery system may still process one or more tasks, such as malware scanning, resolving, compliance processing. Operation 406 may involve a direct write into the recipient mailbox. From operation 406, the routine 400 continues to operation 408.

At operation 408, the message may be processed to subject the message to tasks that were not performed using the direct delivery system. For example, this processing may include archiving, making redundant copies for high availability purposes, and other tasks normally managed by the processing hub 112. From operation 408, the routine 400 proceeds to operation 410, where the routine 400 ends.

Referring now to FIG. 5, additional details will be provided regarding the technologies presented herein for providing delivery optimization of email messages. In particular, FIG. 5 is a flow diagram showing an illustrative routine 500 that provides instant acknowledgement.

The routine 500 begins at operation 502, where the message 106 may be sent via direct delivery system. Operation 502 may involve a direct write into the recipient mailbox and operation 502 may only involve a subset of tasks performed by the processing hub 112. From operation 502, the routine 500 continues on to operation 504. At operation 504, the sender receives instant acknowledgment of delivery receipt of the sent message. The sender may receive the acknowledgment via a direct altering of the message properties 108 in the sender mailbox 104. As discussed above, the message properties 108 may be altered on a per recipient basis. The altering of the message properties 108 may replace the use of a delivery receipt that is communicated from a recipient mailbox.

From operation 504, the routine 500 may continue on to operation 506. At operation 506, the message 106 may be accessed from the recipient mailbox 116, e.g., a recipient user may read the message 106. From operation 506 the routine 500 may continue to operation 508. At operation 508, the sender receives instant acknowledgment of the message 106 being read by the recipient. As in operation 504, the sender may receive the acknowledgment via altering the message properties 108. As discussed above, the message properties 108 may be altered on a per recipient basis. The altering of the message properties 108 may replace the use of a read receipt.

In some configurations, a read receipt may be sent to the mailbox of the sender 104. Instead of delivering the read receipt to a user's mailbox as a new message, the system utilizes the data of the read receipt to change the message properties 108 of the original message 106 in the sender's mailbox. Based on the altered message properties 108, a client may change the appearance of the sent message 106 to graphically indicate the acknowledgement.

Additionally, the message properties 108 may be altered to indicate other statuses of the message 106. The statuses may indicate not delivered and/or not read. A message that is deleted prior to being read can generate a status of not read. The message properties 108 can be altered on a per recipient basis to indicate this status. Likewise, if a message has not been successfully delivered, the message properties 108 can be altered on a per recipient basis to indicate this result. From operation 508, the routine 500 proceeds to operation 510, where the routine 500 ends.

Figure 6:
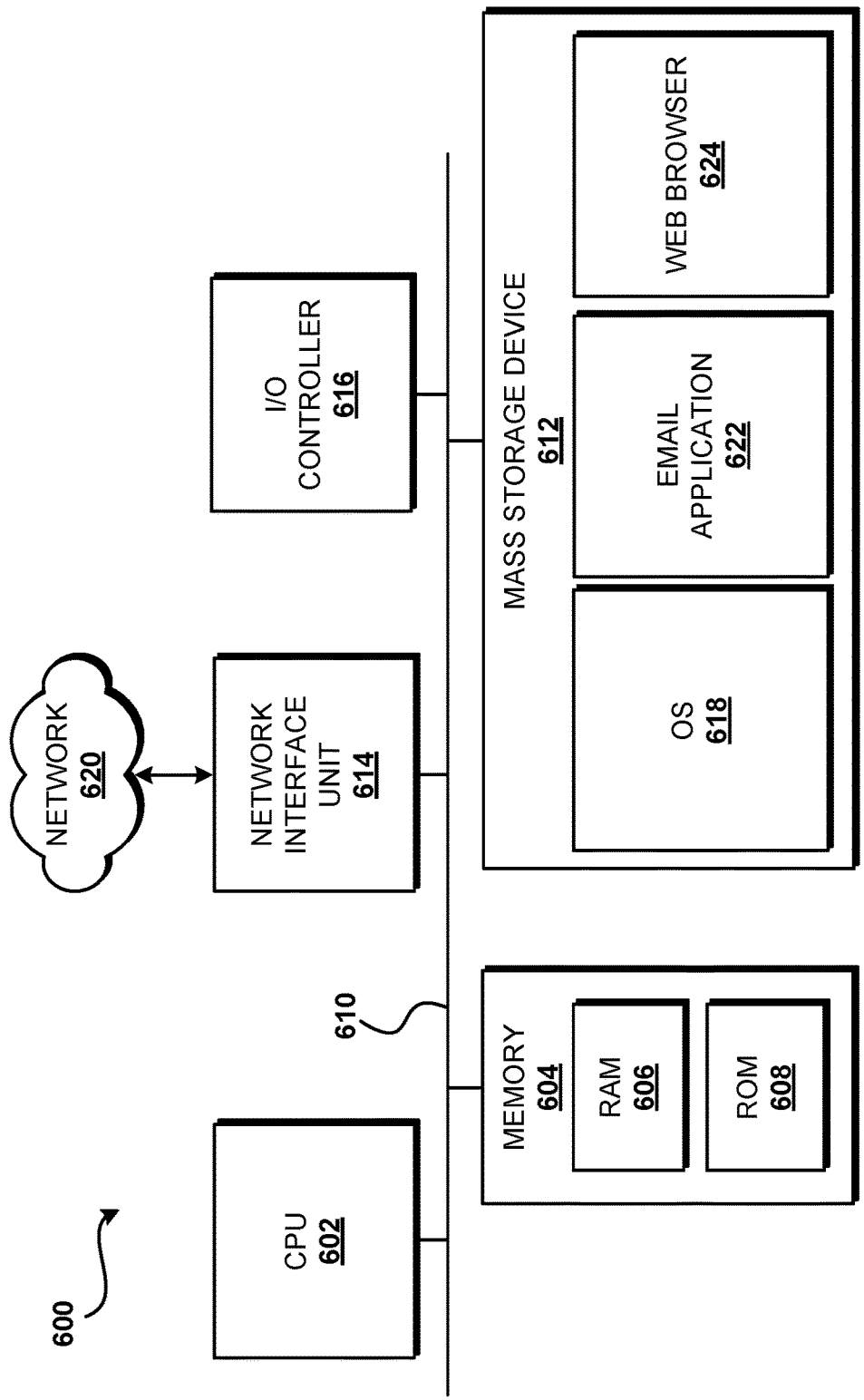
FIG. 6 is a computer architecture diagram illustrating an illustrative computer hardware and software architecture for a computing system capable of implementing aspects of the technologies presented herein.

FIG. 6 illustrates a computer architecture 600 for a device capable of executing some or all of the software components described herein for providing delivery optimization of email messages. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 618 and one or more application programs including, but not limited to, a web browser program 624, and an email application 622. Other executable software components and data might also be stored in the mass storage device 612.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 600. For purposes of the claims, the phrase "computer storage medium," and variations thereof, does not include waves or signals per se and/or communication media.

According to various configurations, the computer architecture 600 may operate in a networked environment using logical connections to remote computers through a network such as the network 620. The computer architecture 600 may connect to the network 620 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
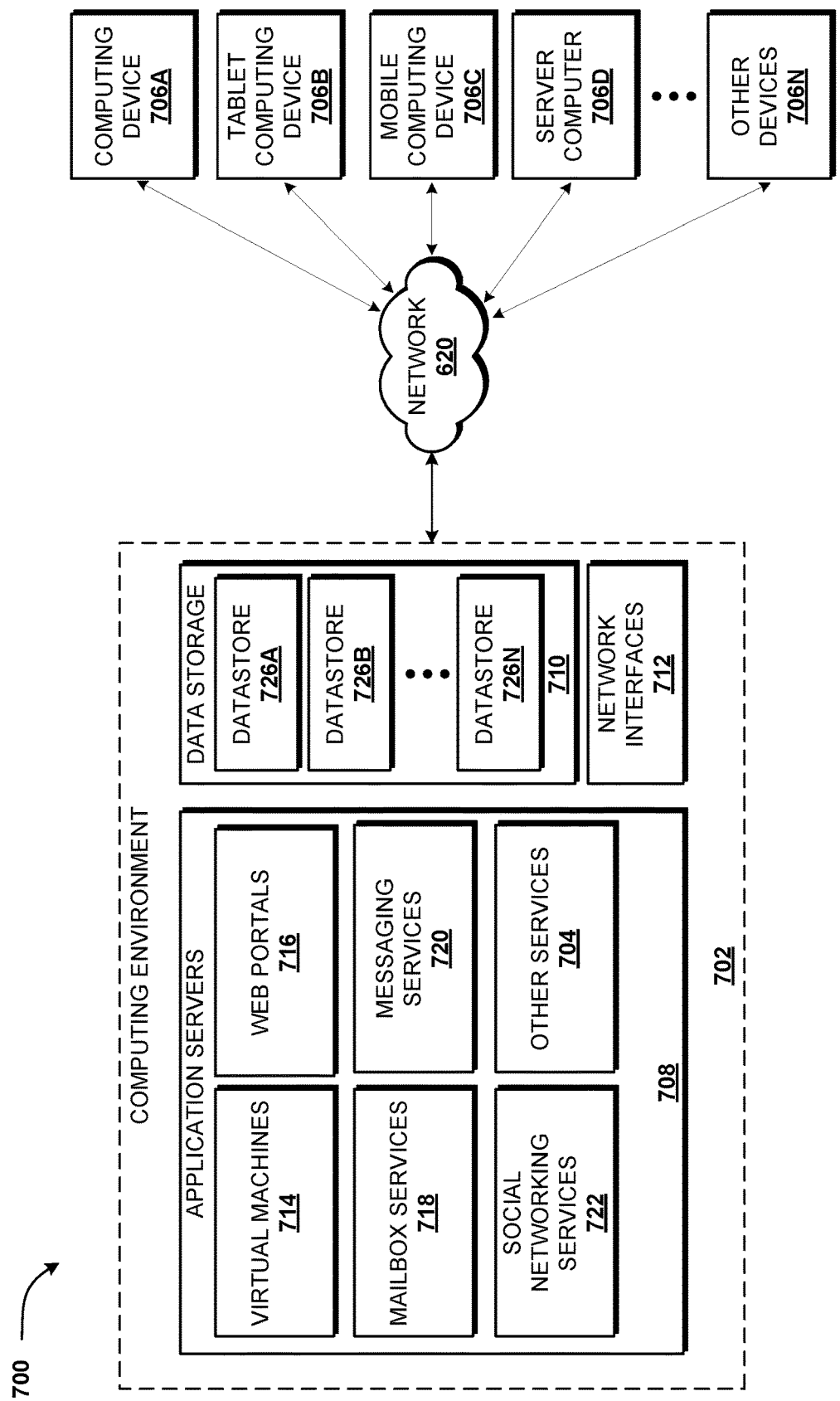
FIG. 7 is a diagram illustrating a distributed computing environment capable of implementing aspects of the technologies presented herein.

Turning now to FIG. 7, which illustrates an illustrative distributed computing environment 700 capable of executing the software components described herein for providing delivery optimization of email messages. Thus, the distributed computing environment 700 illustrated in FIG. 7 can be used to provide the functionality described herein with respect to the FIGS. 1-5. Computing devices in the distributed computing environment 700 thus may be utilized to execute any aspects of the software components presented herein.

According to various implementations, the distributed computing environment 700 includes a computing environment 702 operating on, in communication with, or as part of the network 620. The network 620 also can include various access networks. One or more client devices 706A-706N (hereinafter referred to collectively and/or generically as "clients 706") can communicate with the computing environment 702 via the network 620 and/or other connections (not illustrated in FIG. 7).

In the illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 620. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for providing the functionality described herein. It should be understood that this configuration is illustrative, and should not be construed as being limiting in any way. The application servers 708 also host or provide access to one or more web portals, link pages, web sites, and/or other information ("web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services.

In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way.

As shown in FIG. 7, the application servers 708 also can host other services, applications, portals, and/or other resources ("other resources") 704. The other resources 704 can include, but are not limited to, the functionality described above as being provided by the processing hub 112. It thus can be appreciated that the computing environment 702 can provide integration of the concepts and technologies disclosed herein provided herein for providing delivery optimization of email messages with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 620. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706.

It should also be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing delivery optimization of email messages.

Figure 8:
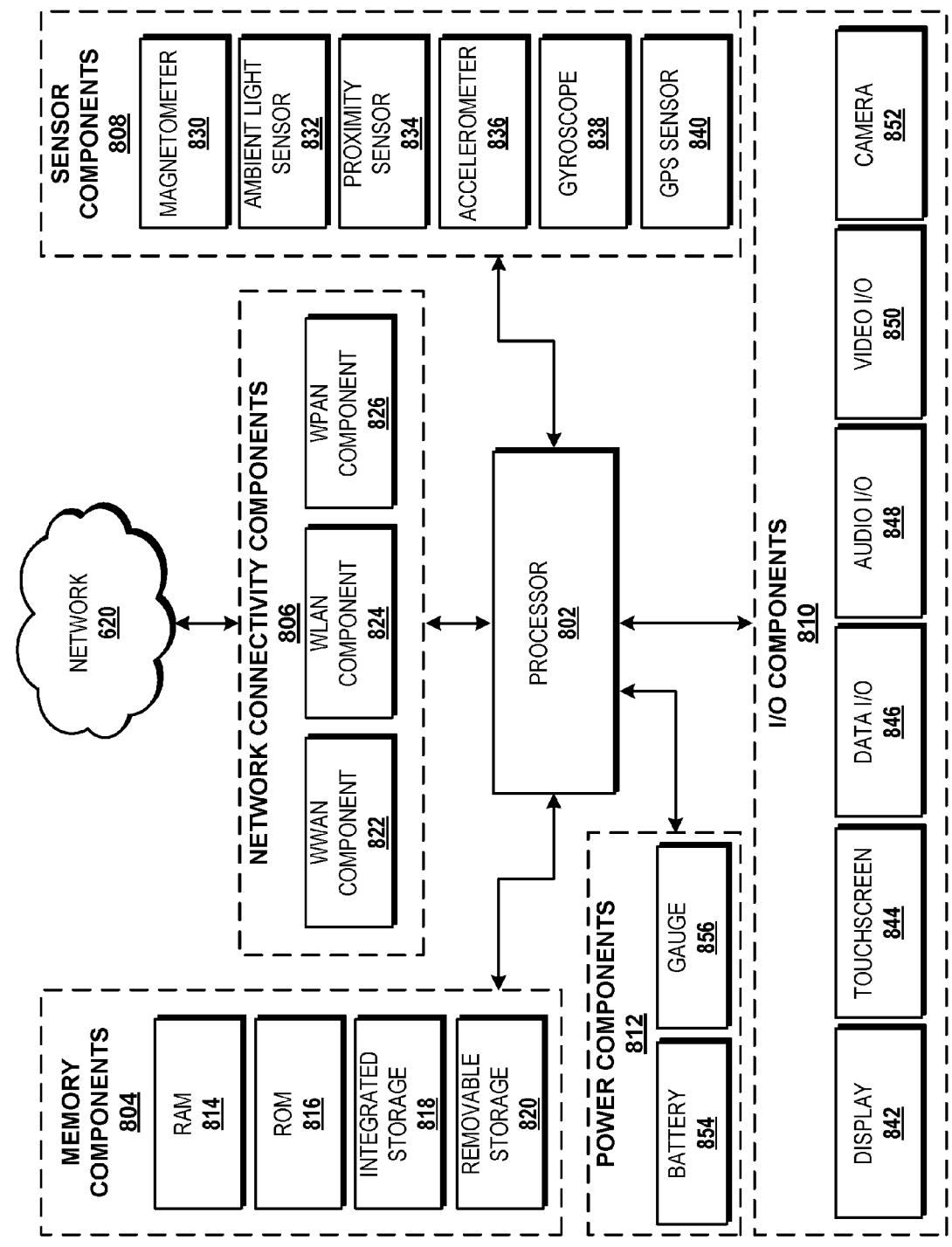
FIG. 8 is a computer architecture diagram illustrating a computing device architecture capable of implementing aspects of the technologies presented herein.

Turning now to FIG. 8, an illustrative computing device architecture 800 will be described for a computing device that is capable of executing the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. Moreover, the computing device architecture 800 is applicable to any of the clients 706 shown in FIG. 7. Furthermore, aspects of the computing device architecture 800 may be applicable to traditional desktop computers, portable computers (e.g., laptops, notebooks, ultra-portables, and netbooks), server computers, and other computer systems. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K ultra-high-definition (UHD) and greater), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system 618 or a portion thereof (e.g., operating system kernel), and/or a bootloader to load an operating system 618 kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system 618 or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system 618. According to various configurations, the operating system 618 includes, but is not limited to, WINDOWS MOBILE OS from MICROSOFT CORPORATION of Redmond, Wash., WINDOWS PHONE OS from MICROSOFT CORPORATION, WINDOWS from Microsoft Corporation, BLACKBERRY OS from RESEARCH IN MOTION LIMITED of Waterloo, Ontario, Canada, IOS from APPLE INC. of Cupertino, Calif., and ANDROID OS from GOOGLE INC. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 620, which may be a WWAN, a WLAN, or a WPAN. Although a single network 620 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

The network 620 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 620 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE ("Long-Term Evolution"), and various other current and future wireless data access standards. The network 620 may be configured to provide voice and/or data communications with any combination of the above technologies. The network 620 may be configured to or adapted to provide voice and/or data communications in accordance with future generation technologies.

In some configurations, the WWAN component 822 is configured to provide dual multi-mode connectivity to the network 620. For example, the WWAN component 822 may be configured to provide connectivity to the network 620, wherein the network 620 provides service via GSM and UMTS technologies, or via some other combination of technologies. Alternatively, multiple WWAN components

822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 620 may be a WLAN operating in accordance with one or more Institute of Electrical and Electronic Engineers ("IEEE") 802.11 standards, such as IEEE 802.11a, 802.11b, 802.11g, 802.11n, 802.11ac and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 620 via the WI-FI access points. Such connections may be secured via various encryption technologies including, but not limited, WI-FI Protected Access ("WPA"), WPA2, Wired Equivalent Privacy ("WEP"), and the like.

The network 620 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, also may be incorporated in the computing device architecture 800.

The magnetometer 830 is configured to measure the strength and direction of a magnetic field. In some configurations the magnetometer 830 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low-light and high-light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. For example, the application program may be a video game in which a character, a portion thereof, or an object is moved or otherwise manipulated in response to input received via the accelerometer 836. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance control of some functionality of the application program. Other uses of the gyroscope 838 are contemplated.

The GPS sensor 840 is configured to receive signals from GPS satellites for use in calculating a location. The location calculated by the GPS sensor 840 may be used by any application program that requires or benefits from location information. For example, the location calculated by the GPS sensor 840 may be used with a navigation application program to provide directions from the location to a destination or directions from the destination to the location. Moreover, the GPS sensor 840 may be used to provide location information to an external location-based service, such as E911 service. The GPS sensor 840 may obtain location information generated via WI-FI, WIMAX, and/or cellular triangulation techniques utilizing one or more of the network connectivity components 806 to aid the GPS sensor 840 in obtaining a location fix. The GPS sensor 840 may also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 may include discrete processors configured to support the various interface described below, or may include processing functionality built-in to the processor 802.

The display 842 is an output device configured to present information in a visual form. In particular, the display 842 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device may have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 844. As such, a developer may create gestures that are specific to a particular application program.

In some configurations, the touchscreen 844 supports a tap gesture in which a user taps the touchscreen 844 once on an item presented on the display 842. The tap gesture may be used for various reasons including, but not limited to, opening or launching whatever the user taps. In some configurations, the touchscreen 844 supports a double tap gesture in which a user taps the touchscreen 844 twice on an item presented on the display 842. The double tap gesture may be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture may be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture may be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture may be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLURAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 may utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 854, which can be connected to a battery gauge 856. The batteries 854 may be rechargeable or disposable. Rechargeable battery types include, but are not limited to, lithium polymer, lithium ion, nickel cadmium, and nickel metal hydride. Each of the batteries 854 may be made of one or more cells.

The battery gauge 856 can be configured to measure battery parameters such as current, voltage, and temperature.

In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component.

The disclosure presented herein may be considered in view of the following clauses.

Clause 1: A method for delivery of a message, the method comprises: receiving the message from a client; analyzing the message or other factors to determine if the message meets one or more conditions to qualify for a direct delivery system; sending the message using a processing hub having a set of operations for delivering the message to a recipient mailbox if it is determined that the message does not meet the one or more conditions to qualify for the direct delivery system; and sending the message using the direct delivery system having a subset of the set of operations for delivering the message to the recipient mailbox if it is determined that the message meets the one or more conditions to qualify for the direct delivery system.

Clause 2: The method of clause 1, wherein sending the message using the processing hub having the set of operations that includes a queuing process, and wherein sending the message using the direct delivery system having the subset of the set of operations does not include the queuing process.

Clause 3: The method of clauses 1-2, further comprising: determining if the direct delivery system of the message fails; and if it is determined that the direct delivery system of the message fails, sending the message using the processing hub having the set of operations for delivering the message to the recipient mailbox.

Clause 4: The method of clauses 1-3, wherein the one or more conditions to qualify for the direct delivery system comprises at least one of a size of the message, a message type of the message, a number of recipients to which the message is addressed, a timestamp of the message, a recipient type and whether a recipient belongs to an organization of a sender.

Clause 5: The method of clauses 1-4, wherein the set of operations for delivering the message comprises at least one of malware scanning, compliance checking, SPAM filtering, creating copies of the message for redundancy for high availability purposes and a resolving process.

Clause 6: The method of clauses 1-5, wherein the subset of the set of operations for delivering the message comprises at least malware scanning.

Clause 7: The method of clauses 1-6, wherein the subset of the set of operations for delivering the message comprises at least compliance checking.

Clause 8: The method of clauses 1-7, wherein analyzing the message or other factors to determine if the message meets the one or more conditions to qualify for the direct delivery system comprises determining qualification for the direct delivery system on a per recipient basis.

Clause 9: A system for delivery of a message, the system comprising: a processor; and a memory in communication with the processor, the memory having computer-readable instructions stored thereupon that, when executed by the processor, cause the processor to perform a method comprising receiving the message from a client, analyzing the message or other factors to determine if the message meets one or more conditions to qualify for a direct delivery system, sending the message using a processing hub having a set of operations for delivering the message to a recipient mailbox if it is determined that the message does not meet one or more conditions to qualify for the direct delivery system, and sending the message using the direct delivery system having a subset of the set of operations for delivering the message to the recipient mailbox if it is determined that the message meets one or more conditions to qualify for the direct delivery system.

Clause 10: The system of clause 9, wherein sending the message using the processing hub having the set of operations that includes a queuing process, and wherein sending the message using the direct delivery system having the subset of the set of operations does not include the queuing process.

Clause 11: The system of clauses 9-10, further comprising: determining if the direct delivery system of the message fails; and if it is determined that the direct delivery system of the message fails, sending the message using the processing hub having the set of operations for delivering the message to the recipient mailbox.

Clause 12: The system of clauses 9-11, wherein the one or more conditions to qualify for the direct delivery system comprises at least one of a size of the message, a number of recipients to which the message is addressed, a timestamp of the message and whether a recipient belongs to an organization of a sender.

Clause 13: The system of clauses 9-12, wherein the set of operations for delivering the message comprises at least one of malware scanning, compliance checking, SPAM filtering and creating copies of the message for redundancy for high availability purposes.

Clause 14: The system of clauses 9-13, wherein the subset of the set of operations for delivering the message comprises at least compliance checking.

Clause 15: The system of clauses 9-14, wherein the subset of the set of operations for delivering the message comprises at least malware scanning.

Clause 16: A method for a delivery of a message, the method comprising: receiving an indication the message has been received from a client; causing an analysis of the message or other factors to determine if the message meets one or more conditions to qualify for a direct delivery system; causing the delivery of the message using a processing hub having a set of operations for delivering the message to a recipient mailbox if it is determined that the message does not meet the one or more conditions to qualify for the direct delivery system; and causing the delivery of the message using the direct delivery system having a subset of the set of operations for delivering the message to a recipient mailbox if it is determined that the message meets the one or more conditions to qualify for the direct delivery system.

Clause 17: The method of clause 16, wherein causing the delivery of the message using the processing hub having the set of operations that includes a queuing process, and wherein causing the delivery of the message using the direct delivery system having the subset of the set of operations does not include the queuing process.

Clause 18: The method of clauses 16-17, further comprising: determining if the direct delivery system of the message fails; and if it is determined that the direct delivery system of the message fails, causing the delivery of the message using the processing hub having the set of operations for delivering the message to the recipient mailbox.

Clause 19: The method of clauses 16-18, wherein the set of operations for delivering the message comprises at least one of malware scanning, compliance checking, SPAM filtering, creating copies of the message for redundancy for high availability purposes and a resolving process.

Clause 20: The method of clauses 16-19, wherein the subset of the set of operations for delivering the message comprises at least malware scanning.

Clause 21: The method of clauses 16-20, wherein the subset of the set of operations for delivering the message comprises at least compliance checking.

Clause 22: The method of clauses 16-21, wherein causing an analysis of the message or other factors to determine if the message meets the one or more conditions to qualify for the direct delivery system comprises determining qualification for the direct delivery system on a per recipient basis.

Clause 23: The method of clauses 16-22, further comprising adding a direct delivery tag to the message in response to determining the message meets the one or more conditions to qualify for the direct delivery system.

Based on the foregoing, it should be appreciated that technologies for providing delivery optimization of email messages have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A method for delivery of a message, the method comprises:
   receiving the message from a client, wherein the message indicates a sender associated with a sender mailbox and a recipient associated with a recipient mailbox;
   analyzing the message to determine that the recipient mailbox and the sender mailbox are in a domain managed by a single entity;
   in response to determining that the recipient mailbox and the sender mailbox are not in the domain managed by the single entity, sending the message using a processing hub having a set of operations that include a queuing process for delivering the message to the recipient mailbox, wherein the set of operations further comprises at least one of malware scanning, compliance checking, SPAM filtering, creating copies of the message for redundancy for high availability purposes or a resolving process; and
   in response to determining that the recipient mailbox and the sender mailbox are in the domain managed by the single entity, adding a direct delivery tag to the message, and sending the message using a direct delivery system having a subset of the set of operations that eliminates the queuing process for purposes of expediting delivery of the message to the recipient mailbox.

2. The method of claim 1, further comprising:
   determining if the direct delivery system of the message fails; and
   if it is determined that the direct delivery system of the message fails, sending the message using the processing hub having the set of operations for delivering the message to the recipient mailbox.

3. The method of claim 1, wherein the one or more conditions to qualify for the direct delivery system comprises at least one of a size of the message, a message type of the message, a number of recipients to which the message is addressed, a timestamp of the message, a recipient type and whether a recipient belongs to an organization of a sender.

4. The method of claim 1, wherein the subset of the set of operations for delivering the message comprises at least malware scanning.

5. The method of claim 1, wherein the subset of the set of operations for delivering the message comprises at least compliance checking.

6. The method of claim 1, wherein the message comprises a plurality of recipients, wherein analyzing the message comprises determining that individual recipients of the plurality of recipients are analyzed on a per recipient basis.

7. A system for delivery of a message, the system comprising:
   a processor; and
   a memory in communication with the processor, the memory having computer-readable instructions stored thereupon that, when executed by the processor, cause the processor to perform a method comprising
   receiving the message from a client, wherein the message indicates a sender associated with a sender mailbox and a recipient associated with a recipient mailbox;
   analyzing the message to determine that the recipient mailbox and the sender mailbox are in a domain managed by a single entity;
   in response to determining that the recipient mailbox and the sender mailbox are not in the domain managed by the single entity, sending the message using a processing hub having a set of operations that include a queuing process for delivering the message to the recipient mailbox, wherein the set of operations further comprises at least one of malware scanning, compliance checking, SPAM filtering, creating copies of the message for redundancy for high availability purposes or a resolving process; and
   in response to determining that the recipient mailbox and the sender mailbox are in the domain managed by the single entity, adding a direct delivery tag to the message, and sending the message using a direct delivery system having a subset of the set of operations that eliminates the queuing process for delivering the message to the recipient mailbox.

8. The system of claim 7, further comprising:
   determining if the direct delivery system of the message fails; and
   if it is determined that the direct delivery system of the message fails, sending the message using the processing hub having the set of operations for delivering the message to the recipient mailbox.

9. The system of claim 7, wherein the one or more conditions to qualify for the direct delivery system comprises at least one of a size of the message, a number of recipients to which the message is addressed, a timestamp of the message and whether a recipient belongs to an organization of a sender.

10. The system of claim 7, wherein the subset of the set of operations for delivering the message comprises at least compliance checking.

11. The system of claim 7, wherein the subset of the set of operations for delivering the message comprises at least malware scanning.

12. A method for a delivery of a message, the method comprises:

receiving an indication the message has been received from a client, wherein the message indicates a sender associated with a sender mailbox and a recipient associated with a recipient mailbox;

causing an analysis of the message to determine that the recipient mailbox and the sender mailbox share a domain managed by a single entity;

in response to determining that the recipient mailbox and the sender mailbox do not share the domain, causing the delivery of the message using a processing hub having a set of operations that include a queuing process for delivering the message to the recipient mailbox, wherein the set of operations further comprises at least one of malware scanning, compliance checking, SPAM filtering, creating copies of the message for redundancy for high availability purposes or a resolving process; and in response to determining that the recipient mailbox and the sender mailbox share the domain, adding a direct delivery tag to the message, and causing the delivery of the message using a direct delivery system having a subset of the set of operations that eliminates the queuing process for delivering the message to the recipient mailbox.

13. The method of claim 12, further comprising:

determining if the direct delivery system of the message fails; and if it is determined that the direct delivery system of the message fails, causing the delivery of the message using the processing hub having the set of operations for delivering the message to the recipient mailbox.

14. The method of claim 12, wherein the subset of the set of operations for delivering the message comprises at least malware scanning.

15. The method of claim 12, wherein the subset of the set of operations for delivering the message comprises at least compliance checking.

16. The method of claim 12, wherein the message comprises a plurality of recipients and wherein the analysis of the message is on a per recipient basis.

* * * * *